Dec. 16, 1930.  E. WILDHABER  1,784,919

TRANSMISSION

Filed July 16, 1928  4 Sheets-Sheet 1

INVENTOR

Ernest Wildhaber

Dec. 16, 1930.   E. WILDHABER   1,784,919
TRANSMISSION
Filed July 16, 1928   4 Sheets-Sheet 2

INVENTOR
Ernest Wildhaber

Dec. 16, 1930.    E. WILDHABER    1,784,919
TRANSMISSION
Filed July 16, 1928    4 Sheets-Sheet 3

INVENTOR
Ernest Wildhaber

Dec. 16, 1930.  E. WILDHABER  1,784,919
TRANSMISSION
Filed July 16, 1928   4 Sheets-Sheet 4

INVENTOR
Ernest Wildhaber

Patented Dec. 16, 1930

1,784,919

UNITED STATES PATENT OFFICE

ERNEST WILDHABER, OF BROOKLYN, NEW YORK

TRANSMISSION

Application filed July 16, 1928. Serial No. 292,947.

The present invention relates to transmissions for transmitting power at changeable ratios from a driving element to a driven element, such as are used for instance in automobiles, trucks and tractors.

One object of the present invention is to provide a transmission which shall permit a change from one ratio to another with great ease, and yet be of a simple and rigid construction. Another aim is to provide an automotive transmission of the said character, which contains a direct drive without gears running in mesh, and which operates with extreme quietness.

A still other object of the present invention is to provide a novel planetary transmission of simple construction which contains novel means for efficiently changing the ratio or gear reduction.

Furthermore a planetary automotive transmission of outstanding simplicity shall be devised, which contains internal orbit gears in continuous mesh with planetary gears, in which no member needs to perform excessive numbers of revolutions, and which operates with minimum tooth loads.

Internal orbit gears maintained in continuous mesh with planetary gears have hitherto presented great difficulties to being accurately journalled and rigidly held in position. It is a major object of the present invention to provide a practical solution for these difficulties, so that a plurality of internal orbit gears may be conveniently provided while maintaining a simple design. Another end in view is to provide a practical planetary transmission for automotive vehicles, in which the ratio may be set with a single selecting member, and to provide a planetary transmission which is controlled practically with the same motions of an operator as established gear shift transmissions.

Other objects will appear in the course of the specification and from recital of the appended claims.

A preferred embodiment of my invention will be described with reference to the accompanying drawings, in which

Fig. 5 also illustrates the operating mechanism of the transmission.

In the drawings, the numeral 11 denotes a drive shaft (see Fig. 1) which receives power from a motor, and 12 denotes a coaxial driven shaft, which in case of automotive transmissions is operatively connected with two or more road wheels of a vehicle. The two shafts 11 and 12 are geared together at a changeable ratio by means of planetary gearing, as will be further described hereafter. The moving parts are protected by and journalled in a stationary casing 13, which is preferably made of two parts secured together through flanges 14, and moreover to the crank casing 15 of the motor.

The planetary gearing proper will now be explained with reference to Fig. 6, Fig. 7, Fig. 8 and Fig. 9.

Figure 6:
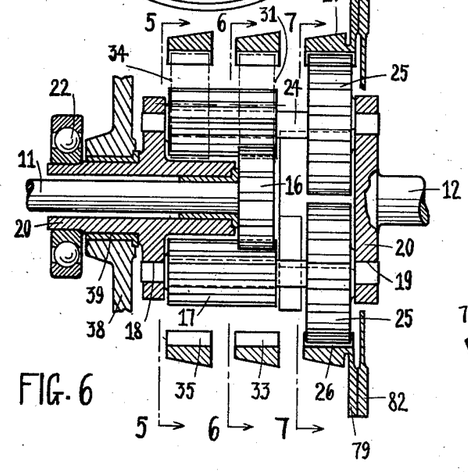
Fig. 6 is an axial section through the transmission gearing proper.

Adjacent one end, drive shaft 11 contains a gear 16 which is either formed integral with said drive shaft or is rigidly secured to it.

Gear 16 meshes with a pair of planetary pinions 17, which are journalled in bearings 18, 19 of planet carrier 20. The latter comprises several parts rigidly bolted together, and is journalled on one side in casing 15 by means of a ball bearing 22 (see also Fig. 1) and on the other side with a ball bearing 22' of a ring portion 23 bolted to casing 13. Bearing 22' is omitted in Fig. 6.

Integral with the shafts 24 of planetary pinions 17 or rigidly secured to them are planetary gears 25 which mesh with an internal orbit gear 26. Said orbit gear is rotatably held in position through its tapered outside surface 27, which bears against a similar inside surface, and is prevented from axial motion in one direction through said tapered surface (see also Fig. 1) and in the other direction through a disk 28. Disk 28 is secured to orbit gear 26 and bears against a lateral portion of a ring shaped projection 48.

Figure 7:
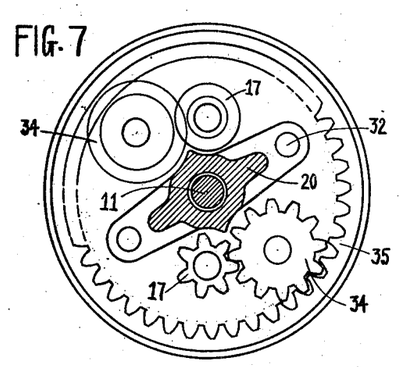
Fig. 7, Fig. 8 and Fig. 9 are sections along lines 5—5, 6—6, 7—7 of Fig. 6 respectively, illustrative of reverse gear, low gear, and intermediate gear of the transmission.
Figure 8:
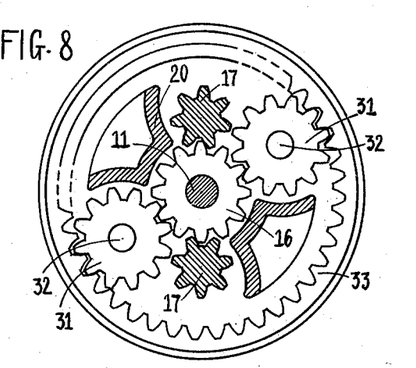
Figure 9:
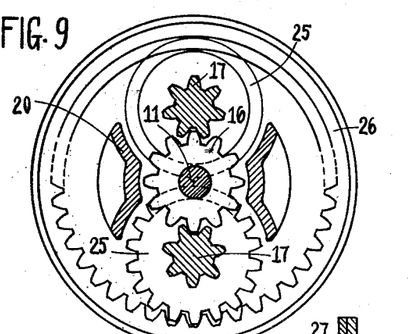

Gear 16 also meshes with planetary gears 31, aside of meshing with the planetary pinions 17, (see Fig. 8). Planetary gears 31 are journalled on separate centers 32 in planet carrier 20, and mesh with an internal orbit gear 33, which is rotatably mounted in the manner described with respect to orbit gear 26. One of the planetary gears 31 is indicated in dash and dot lines in Fig. 6, in its proper radial position. Other planetary gears 34, one of which is also indicated in dash and dot lines in Fig. 6, mesh with the planetary pinions 17 (see also Fig. 7) on one side, and with an internal orbit gear 35 on the other side. The latter again is journalled in the manner described for orbit gear 26. As indicated in the drawings, the orbit gears 26, 33, 35 are preferably made of equal diameters, and their teeth may be made identical.

Direct drive is effected in a manner further to be described, by locking the planetary gearing, so that it turns around as a solid unit, including orbit gears 26, 33, 35. The operation at intermediate gear will now be explained with reference to Fig. 9, which is a section along lines 7—7 of Fig. 6, but also indicates other gears necessary to explain the operation. To effect intermediate gear ratio, orbit gear 26 is held stationary. Planetary gears 25 then roll on stationary orbit gear 26, thereby imparting suitable motion to planet carrier 20. Those familiar with planetary gearing will recognize that the shown structure permits to obtain a suitable intermediate gear ratio with minimum tooth loads and with planets (17, 25) rotating on their centers at an angular speed only slightly in excess of the angular speed of drive shaft 11.

Low gear ratio is effected by maintaining orbit gear 33 stationary, so that the planetary gears 31 roll on stationary orbit gear 33, see Fig. 8. Planetary pinions 17 and planetary gears 25 then turn idle on their centers, as well as orbit gear 26. The same holds true for the other intermeshing gears not taking part in the transmission of power.

Reverse gear ratio is obtained by maintaining orbit gear 35 stationary, so that the planetary gears 34 roll backwardly on stationary orbit gear 35, backward motion being effected on account of the reversal of rotation in transmitting motion from the planetary pinions 17 to planetary gears 34, (see Fig. 7).

The shown design illustrates a planetary automotive transmission with three forward speeds and one reverse speed. Without changing the principle in the least, further speeds may be added, if so desired while retaining the compact and simple general arrangement.

The structural features will now further be described with reference to Fig. 1. It is noted that the internal orbit gears (26, 33, 35) are journalled in single bearings having diameters larger than the diameter of their tooth zones. In consequence a comparatively large sliding motion would occur between the orbit gears and their large diameter bearings, especially when the transmission is operated in direct drive, as it is most of the time in the usual automotive applications. Such sliding motion results in friction loss and in consequent creation of heat, although the internal gears do not carry appreciable load, that is to say do not take part in the transmission of power during such sliding motion.

According to the present invention, a remedy has been provided to overcome this substantial objection: The orbit gears are not journalled directly in a stationary casing, but are mounted in an intermediate rotary member 38, which in direct drive takes part in the rotation of the locked planetary unit. Member 38 is in the form of a cage, and is journalled on the planet carrier 20 by means of bearings 39, 40, the latter being disposed on driven shaft 12, which forms part of the planet carrier. To maintain an orbit gear stationary, it is locked to said member 38, which is then held stationary.

Figure 4:
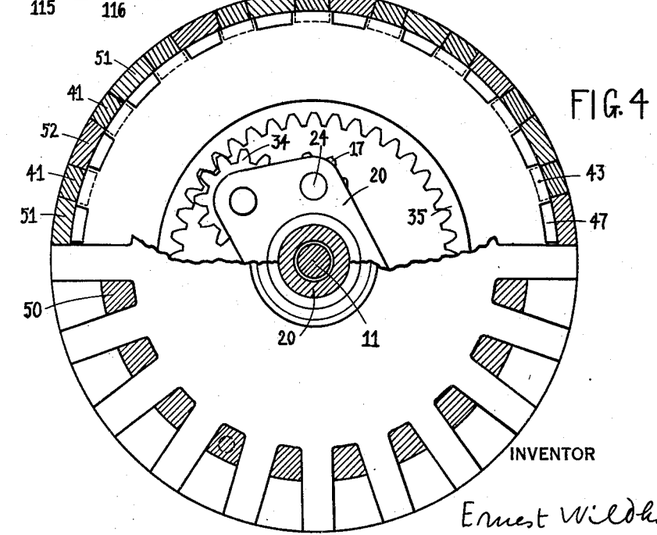
Fig. 4 is a section along lines 4—4 of Fig. 1, with some parts removed.
Figure 5:
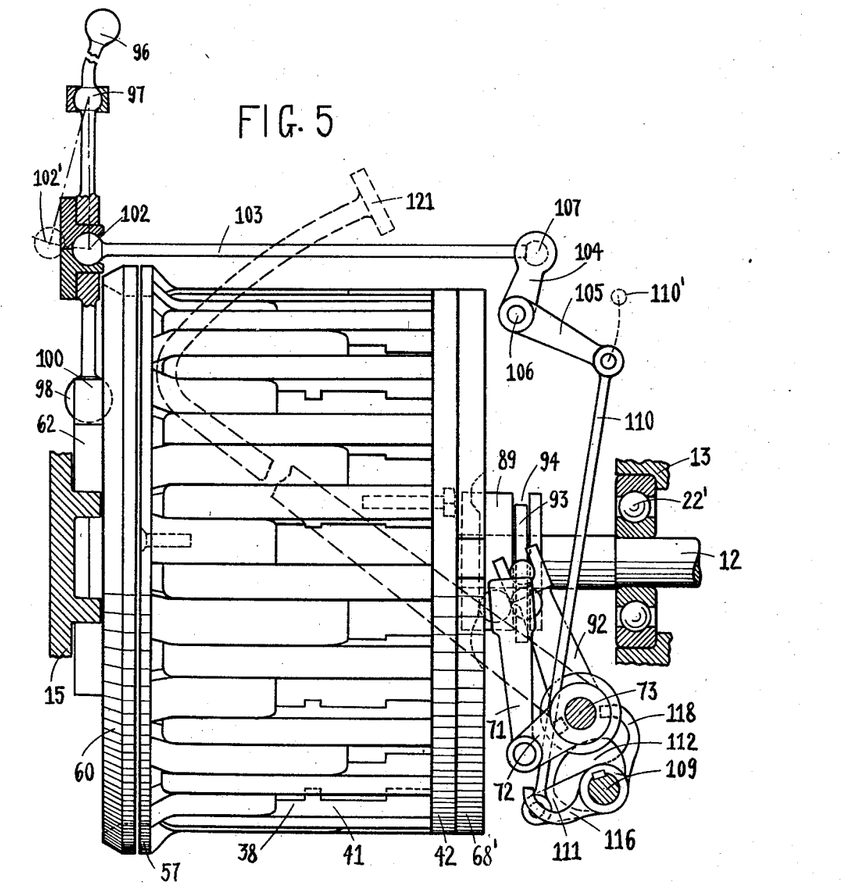
Fig. 5 is a view of a rotary transmission cage, constructed in accordance with the present invention, and forming part of the embodiment illustrated in the other figures.

Member 38 consists of two main parts, namely of a part 41, of the general form of a cylindrical cup or cage, and of a cover 42. An outside view of member 38 is clearly shown in Fig. 5, and Fig. 4 illustrates partly a view of the front end and partly a section through said member. It is seen to contain internal projections 43 (Fig. 1 and Fig. 4) which hold plates 44, 45, 46 against axial displacement in a direction towards the driven side of the transmission. Plate 44, as well as plates 45 and 46, contain slots 47, indicated in the upper half of Fig. 4, to enable the said plates to pass the projections 43 when introduced into the cage 41 from the side of the cover 42. Once in position, the plates are rigidly secured to cage 41 by any suitable means not further indicated. Kinematically, the plates 44, 45, 46 form parts of intermediate member 38. The said plates contain hubs 48, in which the above said internal orbit gears are journalled. Relative motion between a plate and its orbit gear occurs only, when one of the other orbit gears is held stationary, as follows from what has been said above, and does not occur in direct drive.

An orbit gear to be held stationary is frictionally locked with the plate which journals it, by pressing a disk 28 between said plate and an axially movable member, such as 50, 51, 52. The disks 28 contain thin portions 28', which separate the portions where frictional engagement takes place, from the portions with which they are secured to the respective orbit gears, and which permits such slight elastic deflection as is practically required.

Figure 1:
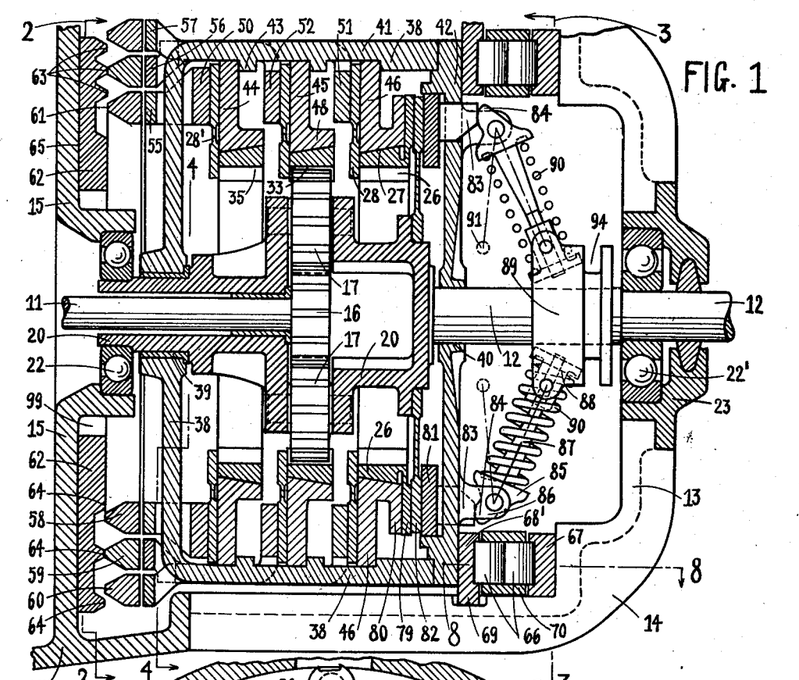
Fig. 1 is an axial section of a planetary transmission, along lines 1—1 of Fig. 3.
Figure 2:
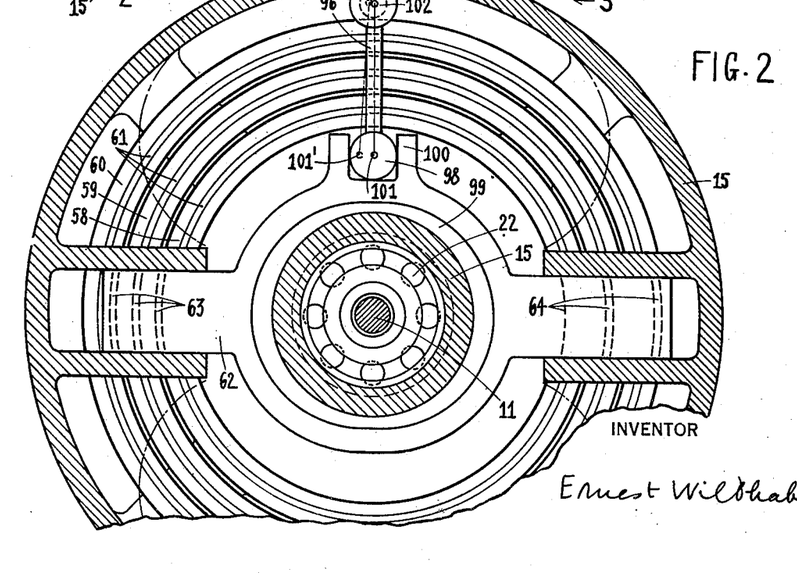
Fig. 2 is a section along lines 2—2 of Fig. 1.

The disposition and structure of said axially movable members is illustrated in Fig. 1, Fig. 4 and Fig. 5. Each of these members contains a plate disposed adjacent its contact with a disk 28 and a series of projections or arms reaching through cage 41. The projections of member 50 are shown in section in Fig. 4, lower half, and the projections of members 51, 52 are indicated in section in the upper half of the same figure. On the outside ends of said projections rings 55, 56, 57 are rigidly secured to the members 50, 51, 52. Preferably the disposition is made such that member 51, which contains intermediate ring 56, cooperates with plate 46, and operates intermediate gear ratio. The said rings are suited to engage stationary rings 58, 59, 60, which are also shown in Fig. 2. The narrow ends 61 of said rings may selectively contact with a selector slide 62. In the position shown in Fig. 1 and Fig. 2 of the drawings the middle ring 59 is in contact with selector slide 62. In consequence when pressure is exerted between said slide and member 38, member 51 will be axially approached to plate 46 and frictionally lock the intermediate disk 28 and with it also orbit gear 26. The stationary rings 58 and 60 will however find no hold on selector slide 62, as the projections of said slide are offset from the narrow ends of said rings. In other words they will miss the projector slide, when pressure is exerted between it and cover 42, and they will not transmit pressure and not frictionally lock the other orbit gears (33, 35) to the cage 41. These may therefore freely turn.

Slide 62 contains projections 63, 64, which are differently spaced apart (see also Fig. 2), and so disposed that they engage the outside ring 60 when slide 62 is moved to one side of the shown central position; and that they engage the inside ring 58, when slide 62 is moved to the other side. The position of selector slide 62 is controlled from the outside by hand, in a manner to be hereafter described.

Figure 10:
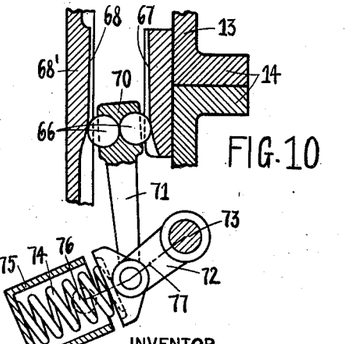
Fig. 10 and Fig. 11 are sections along line 8—8, Fig. 1, illustrative of two different positions of the brake actuating rollers, further described hereafter.

Slide 62 bears at 65 against crank casing 15. Pressure between said casing and cover 42 of intermediate member 38 may be effected by means of rollers 66, which roll on slightly tapered race ways 67, 68. Race ways 67 bear against the stationary casing 13, and race ways 68 form part of a ring 68', which contains projections 69 (Fig. 1 and Fig. 3) engaging said casing in a manner to prevent ring 68' from turning relatively to casing 13. The rollers and race ways, as well as the means for operating them, can best be seen in Fig. 10 and Fig. 11. Two cylindrical rollers 66 contact with each other and are held in position by cage 70, which in the illustrated instance forms part of a lever 71. The latter is operated through another lever 72 pivoted on a shaft 73. A spring 74 is contained in a cylindrical cup 75, which is pivoted with cylindrical projections 76 in stationary bearings. Spring 74 has the dual purpose of safely maintaining the rollers out of engagement with the active portions of the race ways 67, 68 in one of its positions, and of maintaining pressure between the race ways, when engagement has been effected. In Fig. 10, the rollers 66 are shown out of active engagement, and spring 74 effects pressure along a line connecting the center of pivot 76 with the center of the pin connecting the levers 71, 72. This connecting line is slightly inclined to the center line 77 of lever 72, in a manner that spring 74 effects backward pressure, tending to maintain the rollers in the shown position.

Figure 11:
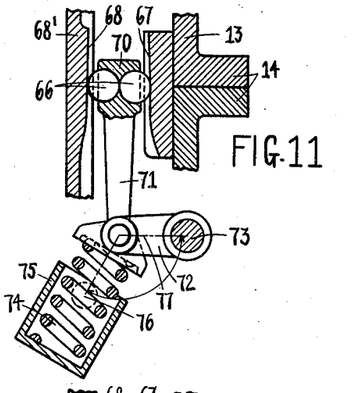

Engagement is effected by turning shaft 73 so as to move lever 72 upwardly. The said connecting line and the center line of lever 72 then pass a dead position and thereafter assume angles as indicated in Fig. 11. As soon as said dead position is passed, spring 74 acts in a direction to complete engagement. In the engaging operation, the rollers roll upwardly on the inclined race ways 67, 68 and thereby separate the said race ways and finally effect pressure between cover 42 and casing 13, which is rigidly connected with crank casing 15. In moving upwards, the rollers also roll upon each other, and operate with a minimum of friction. As they separate the race ways 67, 68 and thereby approach selector slide 62 and member 38, they also axially engage the selected friction clutch for frictionally locking an internal orbit gear to intermediate member 38, as has already been described.

The intermediate member (38) itself is frictionally locked to the transmission casing through its contact with ring 68', containing race ways 68, and through the frictional contact of a ring 55, 56, 57 with a stationary ring 58, 59, 60. The pressure exerted through rollers 66 is therefore utilized for two purposes, namely for frictionally connecting a selected internal orbit gear with intermediate member 38, and moreover for maintaining said member stationary.

Means for effecting direct drive, and their operation will now be described. Orbit gear 26 contains a disk like projection 79, which ordinarily almost contacts with a similar projection 80 of plate 46, and which is connected with the main body of gear 26 through a portion sufficiently thin to permit contact with projection 80 through elastic deflection. Such contact may be effected by approaching a plate 81 towards projection 80, so as to frictionally clamp together rotary member 38, orbit gear 26, and a disk 82, which is secured to planet carrier 20. The thereby effected secure frictional connection between internal orbit gear 26 and planet carrier 20 locks the planetary system, as will be readily understood, and effects direct drive.

Plate 81 contains projections 83, which reach through suitable openings of cover 42, and which are acted upon by teeth 84 of clutch member 85. Each of said members is pivoted on projections 86 of cover 42, and contains an extension 87 terminating in a cylindrical rod. This rod is axially slidable in a part 88 pivoted on a sleeve 89, which may be moved axially on the driven shaft 12. Part 88 as well as clutch member 85 are so shaped as to form seats for a pressure spring 90. Fig. 1 illustrates the engaged position of the clutch for effecting direct drive. The structure of the clutch is also shown in Fig. 3.

The said clutch may be disengaged by moving sleeve 89 to the left (Fig. 1) and again engaged by moving said sleeve to the right (Fig. 1). As sleeve 89 is moved to the left, the clutch members turn on their pivots in a manner that their teeth recede and reduce the pressure exerted on projections 83, and when sleeve 89 moves to the right towards the position shown in Fig. 1, the teeth 84 advance and press plate 81 towards projection 80. In the said engaged position of the clutch and prior to reaching said position, the springs 90 tend to move sleeve 89 outwardly, that is to say to the right, Fig. 1, and thereby tend to further engage the clutch or to maintain engagement under pressure.

In the disengaged position of the clutch the pivots of parts 88 assume positions 91 shown in dotted lines. In this position the springs 90 tend to further move sleeve 89 to the left, Fig. 1, and to maintain the clutch disengaged.

Figure 3:
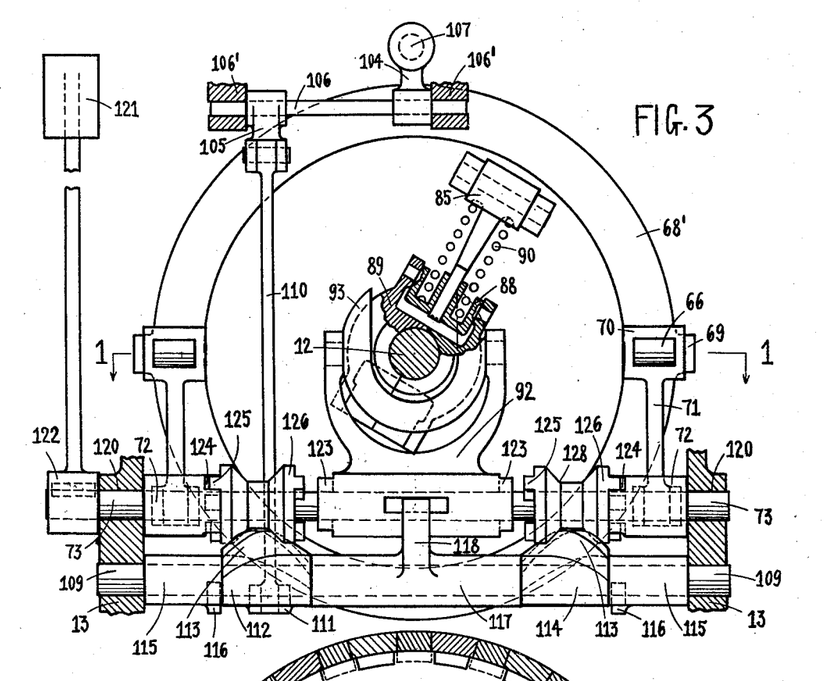
Fig. 3 is an end view, and partly a section along lines 3—3 of Fig. 1, omitting the bulk of the stationary transmission casing.

Sleeve 89 may be axially moved with a forked lever 92, see Fig. 3 and Fig. 5. Lever 92 holds a U-shaped flat sided part 93, which engages a slot 94 of sleeve 89, and which is angularly movable relatively to said lever in a manner permitting it to maintain a position perpendicular to the axis of the driven shaft (12), to continuously fit slot 94. Lever 92 is pivoted on shaft 73 and is operated in a manner described hereafter.

The evident simplicity of design of the illustrated planetary transmission is due to the features described, and to their combination. Some of these features are summed up below: It is noted that the friction clutches for locking the orbit gears to joint member 38 are axially engaging, and that they are disposed adjacent the said orbit gears. The said clutches may be selectively operated in a manner that operation is effected separately from selection and after completed selection. The orbit gears are journalled in a joint rotary member 38 by means of large diameter single bearings.

Shaft 11 may be directly connected with the crank shaft of a motor, if so desired, it being unnecessary to provide an additional clutch between the motor and shaft 11. Preferably however continuously engaged gripping means are provided between the crank shaft of a motor and shaft 11. Gripping means of preferred structure have been described in my application entitled "Gripping device" filed February 23, 1928, Serial No. 256,283. The purpose of such gripping means is to act as a shock filter and to prevent sudden overloads by allowing slippage, and they also warrant good operation even when the transmission is handled without care.

The means for controlling the transmission will now be briefly described. A detailed description of a transmission control is given in my copending application entitled "Transmission", filed on even date herewith, namely on July 16, 1928, Serial No. 292,948.

A hand lever 96 (see Fig. 5) is pivoted in a stationary ball socket 97, and may be moved in two directions controlled by a templet of known structure, which is not indicated. When lever 96 is turned on center 97 in a manner to remain in a plane perpendicular to the transmission axis, that is to say when turned about an axis parallel to the transmission axis, the ball end 98 of lever 96 is moved in a manner to displace selector slide 62. The latter contains a circular opening 99 (see Fig. 2) sufficiently clearing a circular projection of crank case 15, and it further contains projections 100 engaging with ball end 98. During such angular motion of lever 96 center 101 of ball 98 moves for instance to a position 101', so that selector slide 62 then engages outside ring 60 (see also Fig. 1).

Lever 96 contains further a ball joint 102 (Fig. 5), connecting it to a rod 103 which is operatively connected with a lever 104. The latter is rigidly connected with a coaxial lever 105 by means of a shaft 106 mounted in stationary bearings 106'. During the above said motion of lever 96 in a plane perpendicular to the transmission axis, ball joint 102 is somewhat displaced sidewise, but the other spherical end 107 of rod 103 remains in a constant or practically constant position, inasmuch as rod 103 thereby swings on its spherical end 107. Lever 105 is operatively connected with a shaft 109 by means of a rod 110 and a lever arm 111. Shaft 109 serves to operate the clutch for effecting direct drive and the braking means for maintaining the orbit gears stationary. The object in view is to operate either said clutch or said braking means, but never both together, unless especially desired as a braking action apart from the ordinary operation of the transmission. The transmission here described contains means for positively preventing engagement of said clutch, when said braking means are engaged, and for positively preventing engagement of said braking means, when said clutch is engaged, as will now be described.

A member 112 containing a helicoidal projection 113 is integral with the aforesaid lever arm 111, and keyed to shaft 109. Another member 114 containing a helicoidal projection 113 of opposite hand, see Fig. 3, is likewise keyed to shaft 109. Rigidly secured to said shaft are further two symmetrical parts 115 having finger like projections 116, for locking the brake operating mechanism as hereafter described, and a part 117 having a long hub and containing a finger like projection 118, for locking the clutch operating mechanism.

Shaft 73, which carries the levers 92 and 72 for operating the said clutch and the said brake means respectively, is journalled in bearings 120 of casing 13 and may be angularly moved by means of a pedal 121, whose hub 122 is keyed to shaft 73. Levers 92 and 72 are loosely mounted on shaft 73, and contain recesses 123, 124 adjacent their ends. The said recesses may be engaged by teeth 125 of clutch sleeves 126, which are axially movable on splines of shaft 73. In the position of sleeves 126 shown in Fig. 3, their teeth 125 engage the recesses 124 of levers 72, and thereby connect pedal 121 with levers 72. When the sleeves 126 have been shifted to opposite positions, so that their teeth 125 engage the recesses 123 of lever 92, pedal 121 is connected with lever 92. The said sleeves contain tapered grooves 128, whose sides engage with the aforesaid helicoidal projections 113. These projections are suited to shift the sleeves 126 from one side to the other, when they are turned with their shaft 109 through lever arm 111.

Figures 12, 13:
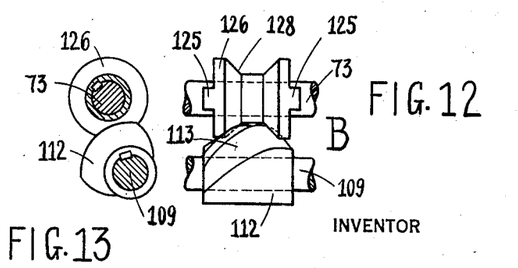
Fig. 12 is a view of means for selectively operating either clutch or brake, as described hereafter.
Fig. 13 and Fig. 14 are end views of said means, illustrative of two different positions, the views being taken from side B, Fig. 12, and are partly shown in section.
Figure 14:
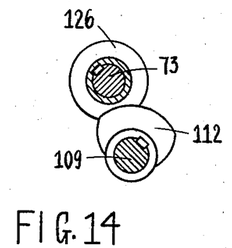

The operative connection between helicoidal projections 113 and a sleeve 126 is separately illustrated in the Figures 12, 13, 14. Fig. 12 and Fig. 13 show a position corresponding to direct drive, with clutch lever 92 connected with pedal 121. The teeth 125 of sleeve 126 then engage the recesses 123 of lever 92, which latter is omitted in the Figures 12, 13, 14. Fig. 14 shows a position corresponding to the connection of pedal 121 with the brake operating means.

In the position indicated in Fig. 3, finger 118 engages a suitable recess formed in the hub of lever 92, and thereby positively holds said lever so as to maintain the said clutch disengaged. When shaft 109 is turned and the sleeves 126 thereby move over into engagement with lever 92, finger 118 recedes from said recess, and the fingers 116 proceed to engage recesses of the levers 72, to positively lock said levers. Shaft 109 is operated only when pedal 121 is depressed, that is to say when foot pressure is applied to said pedal, and in this position of shaft 73 the said recesses fit the fingers 116 or 118 respectively. If so desired, means may be provided for positively preventing operation of hand lever 96 when pedal 121 is not depressed.

To effect low gear, pedal 121 is depressed, hand lever 96 is moved to bring selector slide 62 into proper position, namely the position in which slide 62 contacts with outside ring 60 (see Fig. 1 and Fig. 2), which leaves shaft 109 in the position indicated in Fig. 3 and Fig. 5. The latter figure moreover illustrates a position where the pedal 121 is depressed. The pedal is then released and moves upwardly under the action of a spring, which is not further indicated. Levers 72 thereby move upwardly, pass their dead position, and engage the braking means.

To effect intermediate gear or reverse gear, pedal 121 is again depressed, hand lever 96 is moved to set selector slide 62 into corresponding position, and the pedal is then again released.

Direct drive is obtained by depressing pedal 121, moving hand lever 96 into a position, where ball joint 102 assumes dotted position 102' (see Fig. 5), and where the end of rod 110 assumes dotted position 110', and by again releasing the pedal. Through the motion of hand lever 96 in the manner indicated, that is to say by turning said lever about an axis perpendicular to the drawing plane Fig. 5, shaft 109 is turned. The sleeves 126 are thereby shifted axially into engagement with forked lever 92, which operates the above said clutch, and the levers 72 are locked in disengaged position through said fingers 116.

It is seen that the control of the transmission is simple and very similar to the control of the known gear shift transmissions. It is however safer and requires less care than the control of said transmissions, inasmuch as engagement is effected between frictional surfaces, that is to say between surfaces whose angular position is immaterial.

The similarity of control is believed to be an asset of the planetary transmission here described, inasmuch as anybody familiar with gear shift transmissions is also enabled to immediately operate the said planetary transmission, without mistake and without hesitation.

Many changes and modifications may be made in my invention without departing from its spirit, by simply applying the established knowledge and customary practice of the art.

For definition of its scope it is relied upon in the annexed claims.

What I claim is:

1. In an automotive transmission, a driving element and a driven element, means for operatively connecting said elements, a joint rotatable member, a plurality of individual coaxial members suited to be locked to said joint rotatable member, means for maintaining said joint member stationary, frictional surfaces disposed on said individual members and on said joint member, a selector, means for transmitting pressure from said selector to an individual member, and means for effecting pressure between said selector and said joint member, for frictionally locking a previously selected individual member to said joint member.

2. In a transmission, a driving element and a driven element, planetary gears, a plurality of internal orbit gears meshing with said planetary gears, a joint member, means for maintaining said joint member stationary, said orbit gears being journalled on said joint member with bearings of larger diameter than the diameter of the respective orbit gears, frictional surfaces connected with said orbit gears and disposed adjacent said orbit gears, other frictional surfaces disposed on said joint member and suited to engage with the first said frictional surfaces, a selector, means for transmitting pressure from said selector individually to the frictional surfaces connected with said orbit gears, and means for effecting pressure between said selector and said joint member after selection of an orbit gear, for frictionally locking said orbit gear to said joint member.

3. In an automotive transmission, a driving element and a coaxial driven element, planetary gears, a plurality of gears coaxial with said elements and in constant mesh with said planetary gears, a rotary member coaxial with said elements, said coaxial gears being journalled in said rotary member, means for locking a coaxial gear to said member, and means for maintaining said member stationary.

4. In an automotive transmission, a driving element and a coaxial driven element, planetary gears, a plurality of internal orbit gears meshing with said planetary gears, a rotary member coaxial with said orbit gears, said orbit gears being journalled in said rotary coaxial member, frictional surfaces connected with said orbit gears and disposed adjacent said orbit gears, mating frictional surfaces disposed on said coaxial member, means for selecting an orbit gear, means for transmitting axial pressure to a frictional surface of a selected orbit gear to lock said orbit gear with said coaxial member, and frictional means for maintaining said coaxial member stationary.

5. In an automotive transmission, a driving element and a coaxial driven element, planetary gears, a plurality of internal orbit gears meshing with said planetary gears, a rotary member coaxial with said orbit gears, said orbit gears being journalled in said rotary coaxial member with single bearings having diameters larger than the inside diameters of the teeth of said orbit gears, frictional surfaces connected with said orbit gears and disposed adjacent said orbit gears, mating frictional surfaces disposed on said coaxial member, means for selecting an orbit gear, means for transmitting axial pressure to a frictional surface of a selected orbit gear, thereby locking said orbit gear to said coaxial member, and frictional means for maintaining said coaxial member stationary.

6. An automotive transmission, containing a driving shaft and a coaxial driven shaft, a planet carrier connected with the driven shaft, a sun gear connected with the driving shaft, two internal orbit gears of equal diameter suited to be maintained stationary, a planetary gear meshing simultaneously with said sun gear and with one of said internal orbit gears, two other coaxial planetary gears rigidly connected with each other, said other planetary gears meshing respectively with said sun gear and with the other of said internal orbit gears.

7. An automotive transmission, containing a driving shaft and a coaxial driven shaft, a planet carrier connected with the driven shaft, a sun gear connected with the driving shaft, three internal orbit gears of substantially equal diameters, means for selectively maintaining said orbit gears stationary, a pair of coaxial planetary gears of different diameters rigidly connected with one another and meshing respectively with said sun gear and with one of said orbit gears, another planetary gear meshing simultaneously with said sun gear and with another of said orbit gears, and a further planetary gear meshing simultaneously with the smaller of said coaxial planetary gears and with the third of said internal orbit gears.

8. In an automotive transmission, a driving element and a coaxial driven element, coaxial gears and further gears for operatively connecting said elements at various ratios, a plurality of individual coaxial members containing said coaxial gears, a joint rotatable member, frictional surfaces provided on said members and on said joint member, the frictional surfaces of different individual members being axially displaced with respect to each other, a selector, means for transmitting pressure from said selector to individual members, and means for effecting pressure between said selector and said joint member, for frictionally locking a selected individual member to said joint member.

9. In an automotive transmission, a driving element and a coaxial driven element, coaxial gears and further gears for operatively connecting said elements at various ratios, a plurality of individual coaxial members containing said coaxial gears, a joint rotatable member, bearing means rotatably connecting said coaxial members and said joint member, axially engaging frictional surfaces provided on said members and on said joint member, the frictional surfaces of different individual members being axially displaced with respect to each other, a selector, means for transmitting pressure from said selector to individual members, and means for effecting pressure between said selector and said joint member, for frictionally locking a previously selected individual member to said joint member.

10. In an automotive transmission, a stationary element, a driving element and a coaxial driven element mounted on said stationary element, coaxial gears and further gears for operatively connecting said elements so that the torque transmitted to the driven element is derived from said driving element and said stationary element, a joint rotatable member concentric with said coaxial gears, means for transmitting torque between said joint member and one of said elements, frictional surfaces of equal diameters connected with different coaxial gears and axially displaced relatively to each other, other frictional surfaces disposed on said joint member, a selector, means for transmitting pressure from said selector to the frictional surfaces connected with said gears, and means for effecting pressure between said selector and said joint member after selection of a gear, for frictionally locking said gear to said joint member.

11. In an automotive transmission, a stationary element, a driving element and a coaxial driven element mounted on said stationary element, coaxial gears and further gears for operatively connecting said elements so that the torque transmitted to the driven element is derived from said driving element and said stationary element, a joint rotatable member concentric with said coaxial gears, frictional means for transmitting torque between said joint member and one of said elements, frictional surfaces connected with said coaxial gears and disposed adjacent the respective gears, other frictional surfaces disposed on said joint member, a selector containing a plurality of annular parts, means for selectively transmitting pressure from said annular parts to the frictional surfaces connected with said gears, and means for effecting pressure between a selected annular part and said joint member, for frictionally locking one of said gears to said joint member.

12. In an automotive transmission, a driving element, a coaxial driven element, a planet carrier connected with one of said elements, planetary gears journalled on said planet carrier, a sun gear connected with the other of said elements, a plurality of coaxial gears meshing with said planetary gears, a joint member, plane frictional surfaces connected with said coaxial gears, other plane frictional surfaces disposed on said joint member and suited to engage the first said frictional surfaces, a selector containing a plurality of stationary annular parts of different diameters, each of said parts corresponding to one of said gears, means for transmitting pressure selectively to said annular parts and to the frictional surfaces connected with the corresponding gears, and means for effecting pressure in axial direction between a selected annular part and said joint member, for frictionally locking the corresponding gear to said joint member.

13. In an automotive transmission, a driving element, a coaxial driven element, a planet carrier connected with one of said elements, planetary gears journalled on said planet carrier, a plurality of coaxial gears disposed in continuous mesh with said planetary gears, a rotatable joint member, bearing means for rotatably connecting said coaxial gears and said joint member, a selector, means for frictionally locking one of said coaxial gears after selection to said joint member, and means for maintaining said joint member stationary.

14. In an automotive transmission, a driving element, a coaxial driven element, a planet carrier connected with one of said elements, planetary gears, a concentric gear connected with the other of said elements and meshing with said planetary gears, a plurality of internal orbit gears, a rotatable joint member, said internal orbit gears being journalled in said joint member, a selector, means for frictionally locking one of said orbit gears after selection to said joint member, and means for maintaining said joint member stationary.

15. In an automotive transmission, a driving element and a coaxial driven element, a planet carrier connected with one of said elements, planetary gears, a gear meshing with said planetary gears and connected with the other of said elements, a plurality of internal orbit gears in constant mesh with said planetary gears, a joint rotatable member, said orbit gears being journalled on said joint member with single bearings having diameters larger than the diameter of the tooth zones of the respective orbit gears, and means for maintaining said orbit gears and said joint member stationary to operate gear reductions.

16. In an automotive transmission, a driving element and a coaxial driven element, a planet carrier connected with one of said elements, planetary gears, a gear meshing with said planetary gears and connected with the other of said elements, a plurality of internal orbit gears in constant mesh with said planetary gears, a joint rotatable member, said orbit gears having substantially equal diameters and being journalled on said joint member with single bearings having diameters larger than the diameter of the tooth zones of the respective orbit gears, and means for maintaining said orbit gears and said joint member stationary.

17. In an automotive transmission, a driving element and a coaxial driven element, a planet carrier connected with one of said elements, planetary gears, a gear meshing with said planetary gears and connected with the other of said elements, a plurality of internal orbit gears in constant mesh with said planetary gears, a joint rotatable member, said orbit gears being journalled on said joint member with single bearings having diameters larger than the inside diameter of the teeth of the respective orbit gears, frictional surfaces connected with said orbit gears and disposed adjacent said orbit gears, other frictional surfaces provided on said joint member and suited to engage the first said frictional surfaces, means for selectively locking said orbit gears to said joint member through frictional engagement, and means for maintaining said joint member stationary.

18. In a planetary transmission, a driving element and a coaxial driven element, a sun gear forming part of the driving element, a planet carrier forming part of the driven element, two internal orbit gears of equal diameter, frictional means for maintaining said orbit gears stationary, a planetary member containing two coaxial planetary gears of different diameters, the smaller one of said planetary gears meshing with said sun gear, the other of said planetary gears meshing with one of said orbit gears, and a further planetary gear meshing with said sun gear and with the other of said orbit gears.

19. In a planetary transmission, a driving element and a coaxial driven element, a sun gear forming part of the driving element, a planet carrier forming part of the driven element, two internal orbit gears, frictional means for maintaining said orbit gears stationary, a rotary planetary member containing gear teeth arranged to form two coaxial planetary gears of different diameters, the smaller one of said planetary gears meshing with said sun gear, the other planetary gear meshing with one of said internal orbit gears, said other planetary gear having an outside diameter such that the distance of its outside periphery from the transmission center line is smaller than the height of its gear teeth, and a further planetary gear meshing with said sun gear and with the other of said orbit gears.

20. In an automotive transmission, a stationary element, a driving element and a coaxial driven element mounted on said stationary element, coaxial gears and further gears for operatively interconnecting said elements so that the torque transmitted to the driven element is derived from said driving element and said stationary element, said coaxial gears being rotatable relatively to each other, a joint member concentric with said coaxial gears, frictional means for selectively connecting said coaxial gears with said joint member, and other frictional means for connecting said joint member with one of said elements.

21. In an automotive transmission, a stationary element, a driving element and a coaxial driven element mounted on said stationary element, coaxial gears and further gears for operatively interconnecting said elements, said coaxial gears being rotatable relatively to each other, a joint member concentric with said coaxial gears, means for selecting a coaxial gear, axially engaging friction means for connecting said coaxial gear with said joint member, other axially engaging friction means for connecting said joint member with one of said elements, and means for simultaneously operating both of said friction means.

ERNEST WILDHABER.